US007719782B1

(12) United States Patent
Bates et al.

(10) Patent No.: US 7,719,782 B1
(45) Date of Patent: May 18, 2010

(54) FAST FORWARD MAGNETIC TAPE CARTRIDGE AT FIRST MOUNT

(75) Inventors: Allen Keith Bates, Tucson, AZ (US); Shawn Owen Brume, Tucson, AZ (US); Nhan Xuan Bui, Tucson, AZ (US); Joel Hsien-Li Chen, Tucson, AZ (US); Eric Rolf Christensen, Tucson, AZ (US); Roger Javier Justo, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/349,661

(22) Filed: Jan. 7, 2009

(51) Int. Cl.
*G11B 15/20* (2006.01)

(52) U.S. Cl. ....................................................... 360/69

(58) Field of Classification Search ................. None
See application file for complete search history.

(56) References Cited

U.S. PATENT DOCUMENTS

| 4,532,566 | A | | 7/1985 | Horimoto | 360/132 |
|---|---|---|---|---|---|
| 4,844,378 | A | | 7/1989 | Oishi | 242/199 |
| 4,903,159 | A | | 2/1990 | Kawano | 360/132 |
| 4,979,690 | A | | 12/1990 | Kita | 242/67.1 R |
| 5,349,713 | A | * | 9/1994 | Stimpfl | 360/137 |
| 5,381,292 | A | * | 1/1995 | Richmond | 360/71 |
| 5,416,642 | A | * | 5/1995 | Nakagawara et al. | 360/53 |
| 5,613,082 | A | * | 3/1997 | Brewer et al. | 711/4 |
| 5,907,444 | A | * | 5/1999 | Oguro | 360/69 |
| 6,125,013 | A | * | 9/2000 | Choung | 360/137 |
| 6,222,693 | B1 | * | 4/2001 | Aoki et al. | 360/53 |
| 6,301,067 | B1 | * | 10/2001 | Takayama | 360/69 |
| 6,535,344 | B1 | * | 3/2003 | Takayama | 360/60 |
| 6,762,898 | B2 | * | 7/2004 | Azuma | 360/69 |
| 7,016,137 | B2 | * | 3/2006 | Kato et al. | 360/69 |
| 2003/0194200 | A1 | * | 10/2003 | Yuen et al. | 386/46 |

* cited by examiner

*Primary Examiner*—William J Klimowicz
*Assistant Examiner*—James L Habermehl
(74) *Attorney, Agent, or Firm*—John H. Holcombe (57) ABSTRACT

Handling a magnetic tape cartridge comprises the steps of reading cartridge mount information from the cartridge memory; determining from the cartridge mount information whether the present mount is the first mount of the magnetic tape cartridge; and if so, fast forward and rewind the magnetic tape of the magnetic tape cartridge, e.g., the fast forward is to end of tape (EOT) and the rewind is to beginning of tape (BOT). Alternatively, if the cartridge mount information indicates the present mount is the first mount of the magnetic tape cartridge; monitoring input/output with respect to the magnetic tape cartridge for write errors during the mount; determining whether the number of monitored write errors meets a predetermined threshold; and if so, fast forward and rewind the magnetic tape of the magnetic tape cartridge.

20 Claims, 6 Drawing Sheets

FAST FORWARD MAGNETIC TAPE CARTRIDGE AT FIRST MOUNT

DOCUMENT INCORPORATED BY REFERENCE

Commonly assigned U.S. Pat. No. 7,386,667 is incorporated for its showing of an automated data storage library.

FIELD OF THE INVENTION

This invention relates to magnetic tape of magnetic tape cartridges which may be employed for the storage of data, and, more particularly, to the handling of the magnetic tape.

BACKGROUND OF THE INVENTION

Any magnetic tape cartridge that is employed for the storage of data must be used in a first instance. For example, a magnetic tape cartridge may be inserted into an automated data storage library at an input/output station. The cartridge may be stored temporarily at a storage shelf and subsequently transported to a magnetic tape drive, or may be directly transported to the magnetic tape drive. The cartridge is mounted in the magnetic tape drive, and data is written to the magnetic tape for storage of the data. A customer problem is that, in many instances, when a cartridge is used for the first time, write errors can occur, especially near the beginning of tape (BOT).

SUMMARY OF THE INVENTION

Magnetic tape drives, automated data storage libraries and methods are provided for handling a magnetic tape cartridge having a magnetic tape and having a cartridge memory.

In one embodiment, the method comprises the steps of reading cartridge mount information from the cartridge memory; determining from the cartridge mount information whether the present mount is the first mount of the magnetic tape cartridge; and if so, fast forward and rewind the magnetic tape of the magnetic tape cartridge.

In a further embodiment, the fast forward is to end of tape (EOT) and the rewind is to beginning of tape (BOT).

In another embodiment, the method for handling a magnetic tape cartridge having a magnetic tape and having a cartridge memory, comprises the steps of reading cartridge mount information from the cartridge memory; determining from the cartridge mount information whether the present mount is the first mount of the magnetic tape cartridge; if so, monitoring input/output with respect to the magnetic tape cartridge for write errors during the mount; determining whether the number of monitored write errors meets a predetermined threshold; and if so, fast forward and rewind the magnetic tape of the magnetic tape cartridge.

In a further embodiment, the fast forward is to end of tape (EOT) and the rewind is to beginning of tape (BOT).

In a still further embodiment, the monitoring step comprises monitoring for hard errors.

In another embodiment, the determining step threshold comprises one hard error.

In still another embodiment, additional steps comprise saving the data being written at the occurrence of the hard error; and rewriting the saved data.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
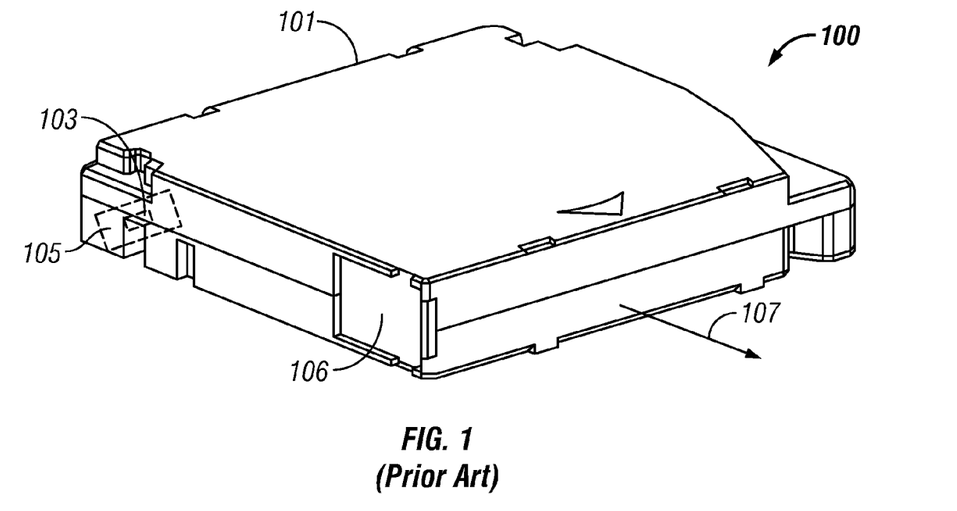
FIG. 1 is a view of a prior art magnetic tape cartridge.
Figure 2:
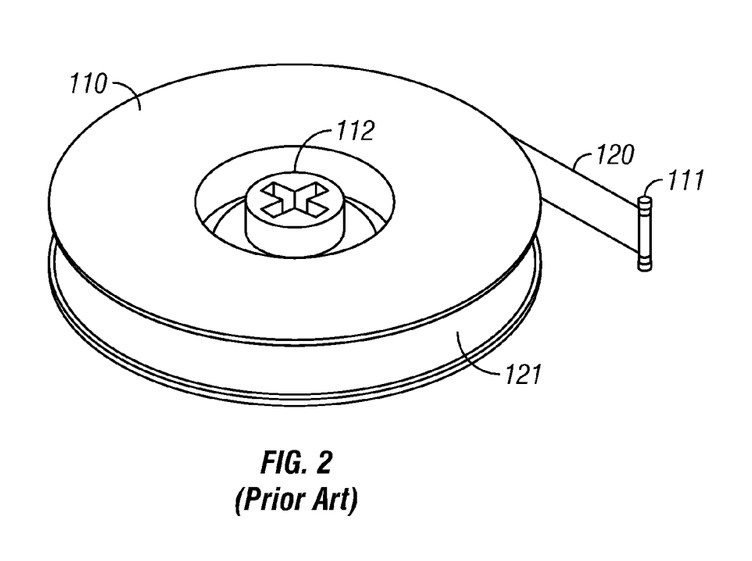
FIG. 2 is an isometric view of a reel of magnetic tape of the magnetic tape cartridge of FIG. 1.

Referring to FIGS. 1 and 2, an example of a magnetic tape cartridge 100 comprises a cartridge body 101, cartridge door 106 and a cartridge memory 103 on circuit board 105.

A rewritable magnetic tape 121 is wound on a reel 110, and a leader pin 111 is used to thread the magnetic tape 121 through the tape path of a magnetic tape drive. As is understood by those of skill in the art, a magnetic tape data storage cartridge comprises a length of magnetic tape wound on one or two reels, an example of which is those adhering to the Linear Tape Open (LTO) format. The illustrated magnetic tape cartridge 100 is a single reel cartridge. Magnetic tape cartridges may also comprise dual reel cartridges in which the tape is fed between reels of the cartridge.

In the tape cartridge 100, a brake button 112 is used to hold the tape reel 110 in place and to prevent it from rotating when tape cartridge 100 is not loaded in a tape drive. An optional tape leader 120 may be interposed between the leader pin 111 and the magnetic tape 121.

The cartridge memory 103, for example, comprises a transponder having a contactless interface, which is retained in the cartridge 100, for example, by being encapsulated by the cartridge when it is assembled, as is understood by those of skill in the art. The cartridge memory is at an angle so that the cartridge memory can be accessed wirelessly by the robot accessor of an automated data storage library or by a magnetic tape drive.

The cartridge memory 103 typically stores information in protected pages and in unprotected pages that can be easily updated. Information stored in the unprotected pages includes mount information which is updated each time the cartridge is mounted in a magnetic tape drive and thereby tracks the number of times that a cartridge is mounted (also called a "thread count"). Since some cartridges have been mounted and initialized at the media manufacturer, the mount (thread) count for a first mount at a magnetic tape drive could be "1" for brand new cartridges. Alternatively, the mount count may be "0" for brand new cartridges of other media manufacturers.

Figure 3:
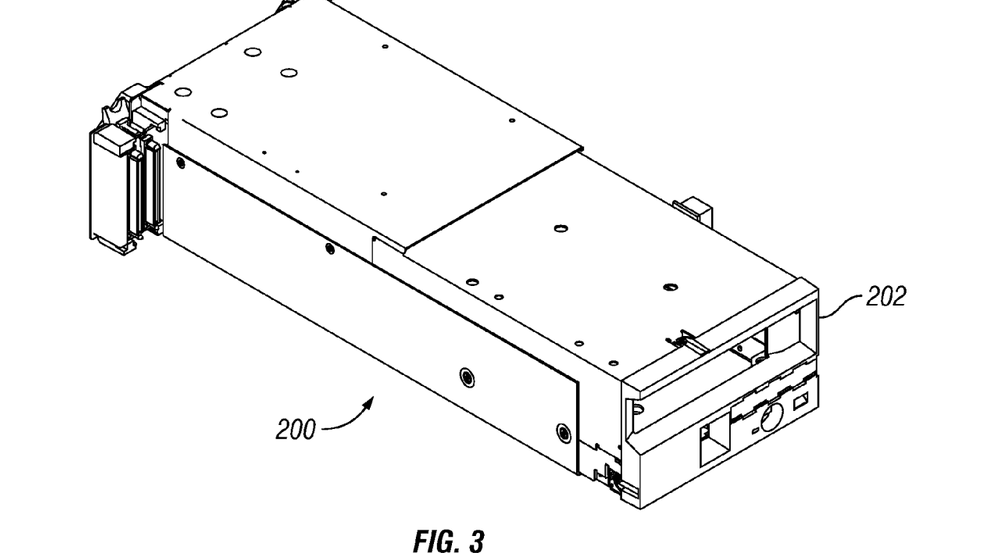
FIG. 3 is a view of a magnetic tape drive which implements the present invention.
Figure 4:
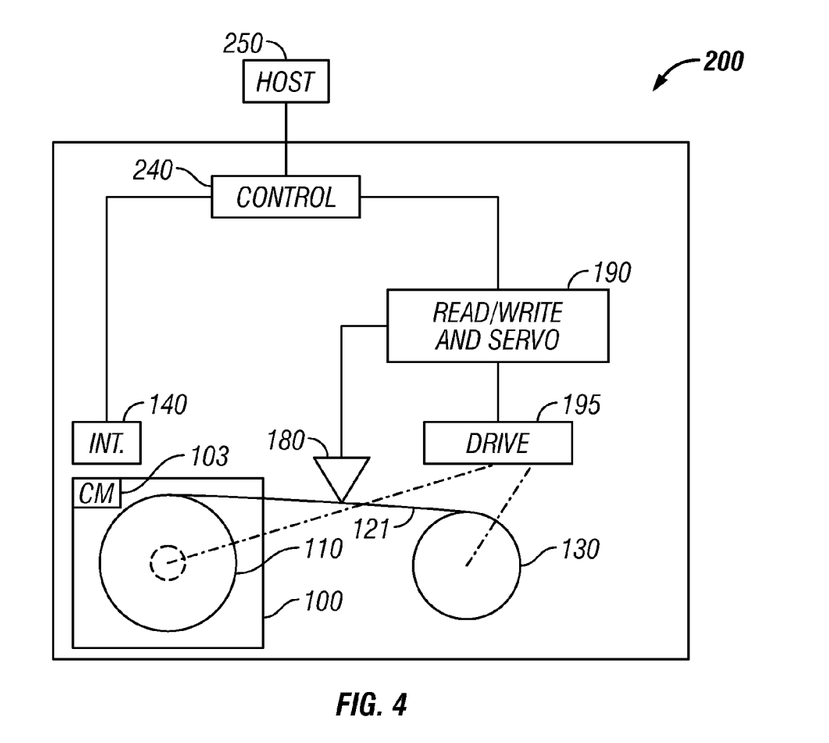
FIG. 4 is a diagrammatic illustration of the magnetic tape drive of FIG. 3.

Referring to FIGS. 3 and 4, a magnetic tape drive 200 is illustrated. One example of a magnetic tape drive in which the present invention may be employed is the IBM® 3580 Ultrium magnetic tape drive based on LTO technology, with microcode, etc., to perform desired operations with respect to the magnetic tape cartridge 100.

A further example of a single reel magnetic tape data storage drive and associated cartridge is the IBM® 3592 TotalStorage Enterprise magnetic tape drive and associated magnetic tape cartridge. An example of a dual reel cartridge is the IBM® 3570 magnetic tape cartridge and associated drive.

Referring to FIGS. 1-4, in the instant example, the magnetic tape cartridge 100 is inserted into opening 202 of the magnetic tape drive 200 along direction 107, and loaded in the magnetic tape drive 200.

The magnetic tape is threaded and fed between the cartridge reel 110 and a take up reel 130 in the magnetic tape drive. Alternatively, both reels of a dual reel cartridge are driven to feed the magnetic tape between the reels.

The magnetic tape drive comprises a memory interface 140 for reading information from, and writing information to, the cartridge memory 103 of the magnetic tape cartridge 100, for example, in a contactless manner. A read/write system is provided for reading and writing information to the magnetic tape, and, for example, may comprise a read/write and servo head system 180 with a servo system for moving the head laterally of the magnetic tape 121, a read/write servo control 190, and a drive motor system 195 which moves the magnetic tape 121 between the cartridge reel 110 and the take up reel 130 and across the read/write and servo head system 180. The read/write and servo control 190 controls the operation of the drive motor system 195 to move the magnetic tape 121 across the read/write and servo head system 180 at a desired velocity, and, in one example, determines the lateral location of the read/write and servo head system with respect to the magnetic tape 121. In one example, the read/write and servo head system 180 and read/write and servo control 190 employ servo signals on the magnetic tape 121 to determine the longitudinal location of the read/write and servo head system, and in another example, the read/write and servo control 190 employs at least one of the reels, such as by means of a tachometer, to determine the longitudinal location of the read/write and servo head system with respect to the magnetic tape 121. The read/write and servo head system 180 and read/write and servo control 190 may comprise hardware elements and may comprise any suitable form of logic, including a processor operated by software, or microcode, or firmware, or may comprise hardware logic, or a combination. The drive system 195 may also be operated to fast forward the magnetic tape and to rapid rewind the magnetic tape at high speed without reading or writing data.

A control system 240 communicates with the memory interface 140, and communicates with the read/write system, e.g., at read/write and servo control 190. The control system 240 may comprise any suitable form of logic, including a processor operated by software, or microcode, or firmware, or may comprise hardware logic, or a combination.

The illustrated and alternative embodiments of magnetic tape drives are known to those of skill in the art, including those which employ dual reel cartridges.

The control system 240 typically communicates with one or more host systems 250, and operates the magnetic tape drive 200 in accordance with commands originating at a host. Alternatively, the magnetic tape drive 200 may form part of a subsystem, such as an automated data storage library, and may also receive and respond to commands from the subsystem.

As illustrated, the magnetic tape drive 200 provides information to, and reads information from, the cartridge memory 103 of the magnetic tape cartridge 100, and provides information to, and reads information from, the magnetic tape 121 of the magnetic tape cartridge 100.

Figure 5:
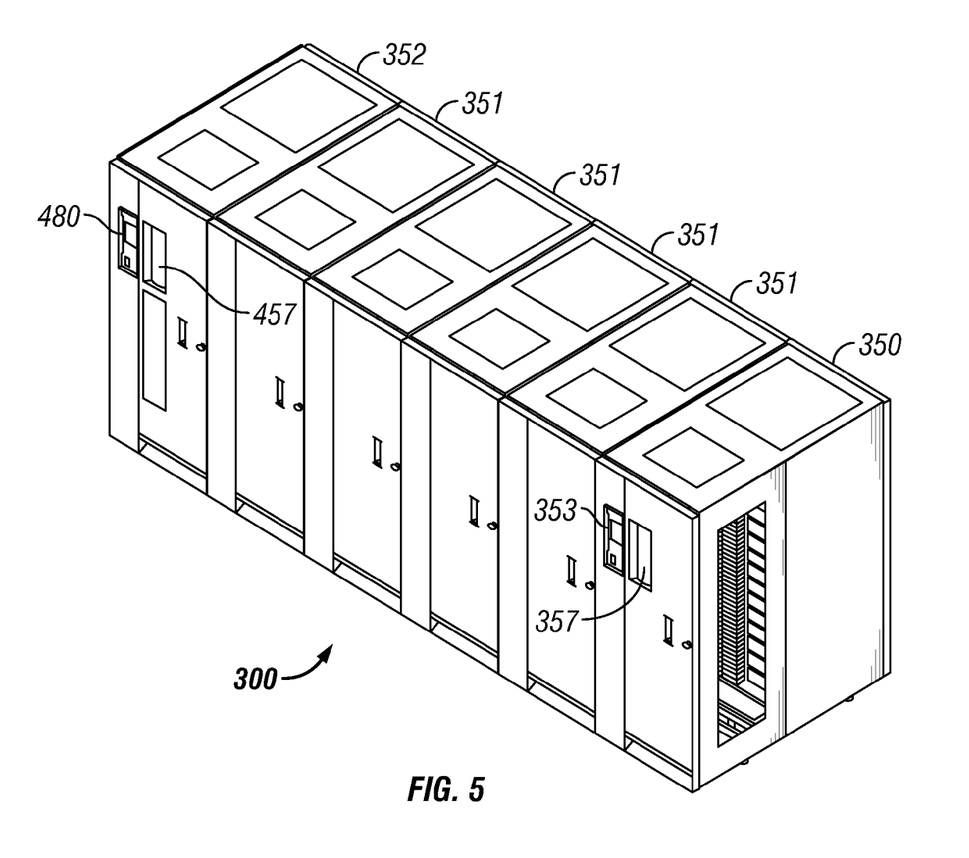
FIG. 5 is a view of an automated data storage library which implements the present invention.
Figure 6:
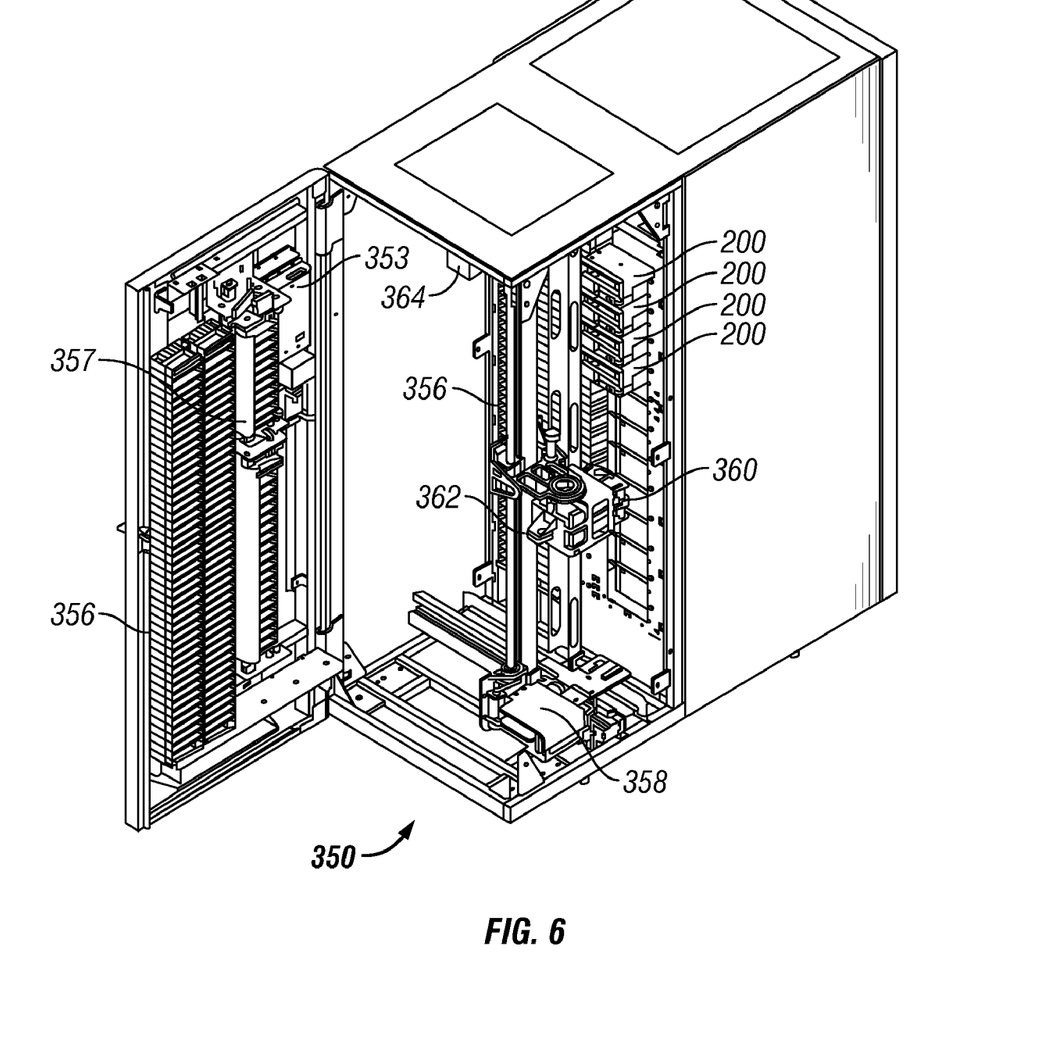
FIG. 6 is view of an open frame of the automated data storage library of FIG. 5.
Figure 7:
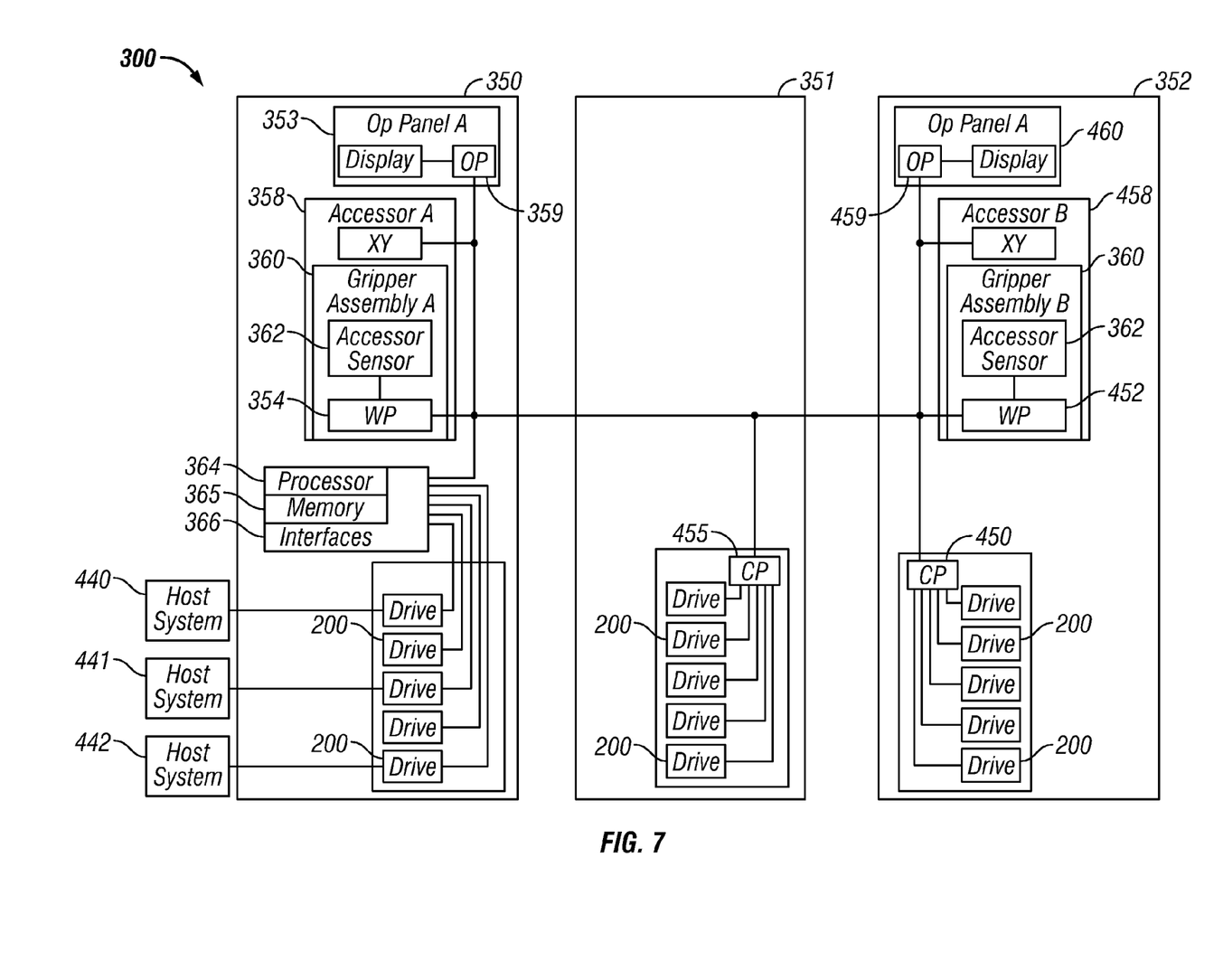
FIG. 7 is a diagrammatic illustration of the automated data storage library of FIG. 5.

FIGS. 5, 6 and 7 illustrate an embodiment of an automated data storage library 300, configured in accordance with the present invention, which is arranged to access data storage media, such as magnetic tape cartridges, typically in response to commands from at least one external host system, and comprises one or more frames 350, 351, 352, each of which may have a plurality of storage shelves 356 for storing the cartridges, and may have a plurality of magnetic tape data storage drives 200 for reading and/or writing data with respect to the magnetic tape cartridges. The library 300 further comprises at least one robot accessor 358, 458 for transporting the cartridges between the storage shelves 356 and the data storage drives 200. The robot accessor 358, 458 comprises a gripper assembly 360 for gripping one or more cartridges, and comprises an accessor sensor 362 comprising an interface to read information from, and writing information to, the cartridge memory 103 of the magnetic tape cartridge 100 of FIG. 1, for example, in a contactless manner. The accessor sensor may also comprise a reading system, such as an LED (Light Emitting Diode) emitter/detector, a bar code scanner, RFID reader, or other reading system to read the labels of the cartridges or about the library.

The library 300 also comprises one or more library controllers 364 to operate the library, communicate with a host system 440 or host systems, communicate with the data storage drives 200, and may communicate with other processors of the library (if present). Alternatively, the data storage drives 200 may communicate with a host system or systems 441, 442, directly, and the library to host system or systems communication may be through the tape drive communication. Further, the library may provide one or more operator panels 353, 460, 480 for communicating with the library controller. The library controller may be set up as a centralized control system, or as a distributed control system. In the example of a distributed control system, additional processors 354, 359, 455, 450, 452, 459 may together with processor 364 comprise the library controller, and operate specific functions of the library. For example, processors 354 and 452, called "WP", may operate the robot accessors 358, 458 to transport the data storage cartridges, processors 359, 459, called "OP", may control the operator panels 353, 460, 480, and processors 364, 455, and 450, called "CP", may provide communications to data storage drives, host computers, remote computers, etc. An example of an automated data storage library comprises the IBM® TS3500 tape library.

The library controller(s) typically comprises logic and/or one or more microprocessors with memory, such as memory 365 illustrated as provided for processor 364, for storing information and program information for operating the microprocessor(s). Herein "processor" may comprise any suitable logic, microprocessor, and associated memory for responding to program instructions, and the associated memory may comprise fixed or rewritable memory or data storage devices. The program information may be supplied to the library controller or memory from a host 440, 441, 442, or via a data storage drive 200, or by an input from a floppy or optical disk, or by being read from a cartridge, or by a web user interface or other network connection, or by any other suitable means. Processors 354, 359, 455, 450, 452, 459, may also be provided with memory of a lesser or greater capacity, and the memory may also be a non-volatile memory, a volatile memory, or may comprise both.

Data storage cartridges may be added to or removed from the library, for example, at input/output stations 357, 457. Typically, cartridges that have been unused for some period of time are removed from the library and may be archived. New, uninitialized cartridges are added to the library to store new data. The input/output stations 357, 457 typically provide a signal to identify that a cartridge or cartridges are input into the library, or that an input/output station door has been opened and/or closed.

An inventory is typically maintained by either the library, e.g. at one or more of the processors, or for the library by a host. Herein, the processor(s) of the library or of the host that maintains the inventory is called a "library controller", such as library controller 364. The inventory is of data storage cartridges, identifying active cartridges and a scratch pool, and their current location within the library, for example, the storage shelf storing the cartridge, or, if the cartridge is in a drive, identifying that drive.

The library controller 364 (and other processors) are provided with interfaces 366 configured to communicate with the host system 440, 441, 442, or host systems, communicate with the data storage drives 200, and communicate with other processors of the library. The interfaces 366 may comprise serial interfaces such as RS-232 (Recommended Standard), USB (Universal Serial Bus), SAS (Serial Attached SCSI), IEEE 1394 (Institute of Electrical and Electronics Engineers), Fibre Channel, or any other serial interface as is known to those of skill in the art. Alternatively, interfaces 366 may comprise optical interfaces such as Fibre Channel, ESCON (Enterprise Systems CONnection), or any other optical interface as is known to those of skill in the art. In addition, interfaces 366 may comprise wireless interfaces such as IEEE 802.11, or any other wireless interface as is known to those of skill in the art. Still further, interfaces 366 may comprise parallel interfaces such as SCSI (Small Computer Systems Interface), or any other parallel interface as is known to those of skill in the art.

Figure 8:
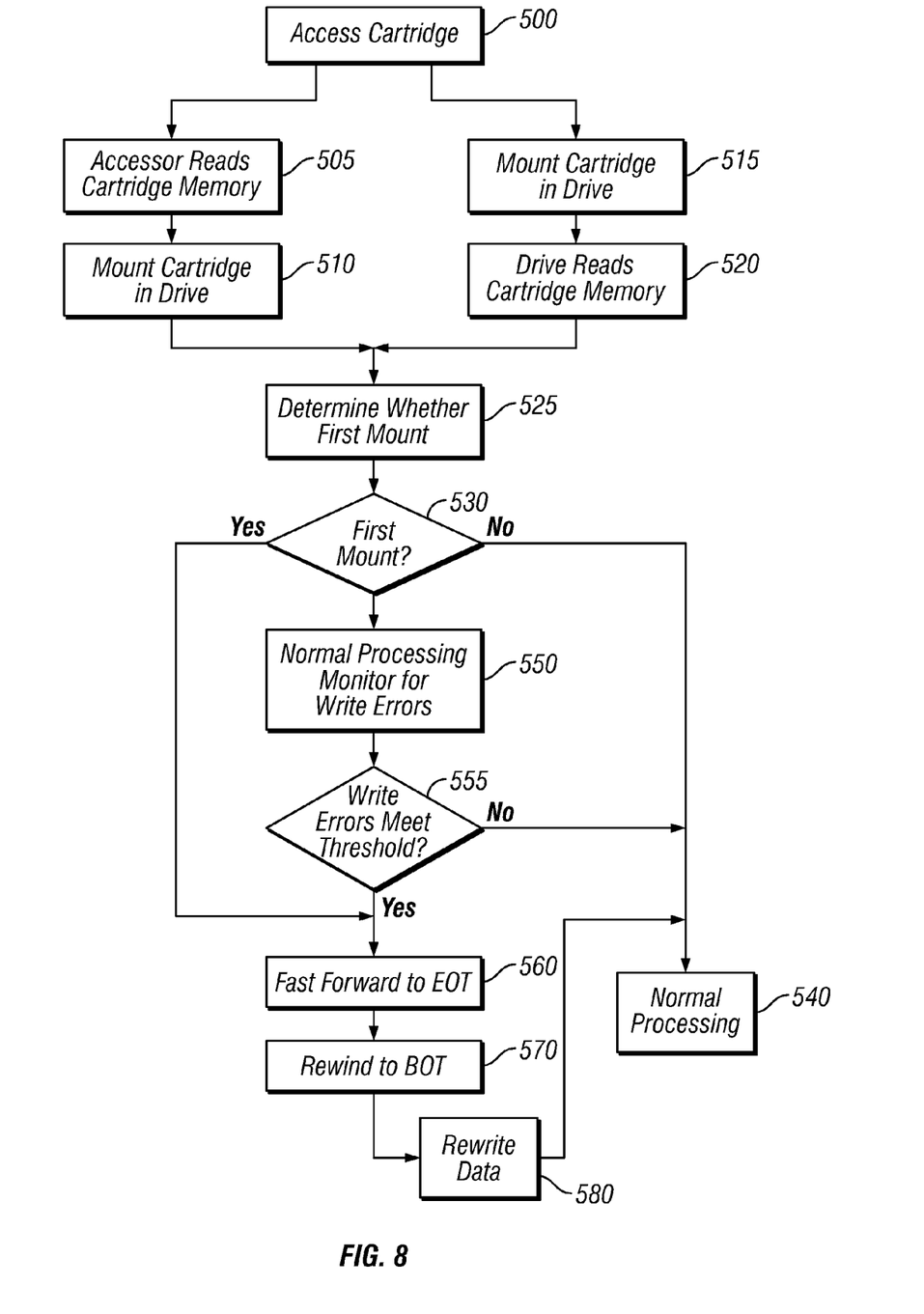
FIG. 8 is a flow chart depicting embodiments of the methods of the present invention.

Referring to FIG. 8, and also to FIGS. 1, 4, 6 and 7, a magnetic tape cartridge 100 is accessed in step 500, for example, from a storage shelf 356 of an automated data storage library 300 by a robot accessor 358, 458. Alternatively, the magnetic tape cartridge is accessed from an input/output station 357, 457. Still alternatively, especially in the absence of an automated data storage library, the magnetic tape cartridge is accessed manually, or is accessed from a cartridge loader, or is accessed manually in an automated data storage library without using the accessor.

The cartridge memory 103, in one embodiment, is read in step 505 by the accessor 358, 458, at sensor 362, and the cartridge 100 is mounted in a magnetic tape drive 200 in step 510.

Alternatively, the cartridge 100 is mounted in a magnetic tape drive 200 in step 515, and the cartridge memory 103 is read in step 520 by the magnetic tape drive.

As discussed above, each time that a magnetic tape cartridge 100 is mounted in a magnetic tape drive 200, a thread (or mount) count is updated, and a brand new cartridge, for example provided from an input/output station 357, 457, can be identified as such by its thread count.

In step 505 and in step 520, the information read from the cartridge memory 103 includes the thread count. In addition, the manufacturer information and/or initialization information is also read from the cartridge memory. Step 525 employs information read from the cartridge memory to determine whether the present mount of the cartridge is its first mount. For example, the thread count may be "0", or the manufacturer may have initialized the cartridge and the thread count may be "1", and step 525 determines that this is the first mount of the cartridge, "YES" in step 530. Any other thread count indicates that this is not the first mount of the cartridge, "NO" in step 530.

The determination of step 505 may be conducted by a processor, such as processor 364, of the automated data storage library from information read by the accessor 358, 458, at sensor 362, or may be conducted by a processor, such as control 240, of the magnetic tape drive from information read at the interface 140 or by the accessor 358, 458, at sensor 362, and communicated to the magnetic tape drive.

If step 530 indicates that the mounted magnetic tape cartridge is not a first mount, normal processing of the cartridge is conducted in step 540.

If, however, step 530 indicates that the mounted magnetic tape cartridge is a first mount, "YES", either of two processes may be conducted in accordance with the present invention.

In one process illustrated as step 550, normal processing of the magnetic tape cartridge is conducted, which, since the cartridge is initially a blank cartridge, necessarily includes writing to the magnetic tape. During the normal processing, the control 240 of the magnetic tape drive monitors input/output with respect to the magnetic tape cartridge for write errors during the mount.

Write errors are typically of two types, "soft errors" and "hard errors". The distinction between the two types is based on the number of ECC (Error Correction Code) errors being corrected at any one time for a given error. If the ECC can correct the error, it is a "soft" error, meaning that few enough bits were lost to allow the ECC to correct it. However, if more bits were lost than the ECC can compensate for, it becomes a "hard" (uncorrectable) error. Errors are detected during the write process by the write-verify conducted in parallel to writing the data to the magnetic tape. In normal processing, the detection of a hard ECC error would trigger a write-skip to a new section of the magnetic tape further downstream which hopefully would be less error prone. Also, such a write-skip could be triggered by too many bits needing correcting by the ECC even though they are correctable (for example, if the number of lost bits is 1 less than a cause of a hard error, why risk the hard error, and do a write skip). Also in the normal processing of step 550, the control maintains an original copy of the data, so that in the event of a hard error, the data is not lost and may be rewritten.

It is considered a crisis if the magnetic tape has a single hard error, although it is feasible that a tape cartridge could have several hard errors.

In step 555, the monitoring processor compares the number of detected errors to a threshold. In one example, the monitoring step 550 comprises monitoring for hard errors, and the determining step 555 threshold comprises one hard error, "YES" in step 555.

Alternatives include monitoring for write-skips or monitoring for soft errors as well as hard errors. In one example, dual thresholds are provided, one a single hard error, and the other a single write-skip not caused by a hard error. In another example, the dual thresholds comprise, one a single hard error, and the other a predetermined number of soft errors.

If the threshold(s) is not met, the process moves to step 540 to continue the normal processing of the magnetic tape.

Meeting the threshold leads to step 560.

The alternative process from step 530 having determined that the present mount of the cartridge is the first mount, directly leads to step 560 without monitoring for errors.

In step 560, the magnetic tape drive control 240 operates the drive motor system 195 to move the magnetic tape 121 at a fast forward velocity without reading or writing data. The fast forward, in one embodiment, is to the end of tape (EOT), which may be near the physical end of the tape as spooled, for example, from reel 110. Enough of the tape must remain on the reel 110 at EOT that the tape may be rewound.

In step 570, the magnetic tape drive control 240 operates the drive motor system 195 to rewind the magnetic tape 121 from reel 130 back onto reel 110 at a rapid velocity without reading or writing data. The rewind is back to the beginning of tape (BOT) near the physical end of the tape at the leader pin 111 or the leader tape 120.

Herein, it is an opinion that the problem of write errors at the first mount is both troublesome and temporary, and caused by media particles and debris from the manufacturing process, and that the particles and debris are non-adhesive in nature. As the result of steps 560 and 570, the problematic particles and debris are knocked off of the tape and the tape may then be processed as normal in step 540. The process, subsequent to steps 560 and 570, leads to step 580 to rewrite data that was saved in step 550 and that may have been written with errors. The process then leads to step 540 for normal processing of the magnetic tape.

The invention can take the form of an entirely hardware embodiment, an entirely software embodiment or an embodiment containing both hardware and software elements. In a preferred embodiment, the invention is implemented in software, which includes but is not limited to resident software, microcode, firmware, etc., implemented by the magnetic tape drive 200, optionally in conjunction with the automated data storage library 300.

Furthermore, the invention can take the form of a computer program product accessible from a computer usable or computer readable medium providing program code for use by or in connection with a computer or any instruction execution system. For the purposes of this description, a computer usable or computer readable medium can be any apparatus that can contain, store, or transport the program for use by or in connection with the instruction execution system, apparatus, or device.

The medium can be an electronic, magnetic, optical, electromagnetic, infrared, or semiconductor system (or apparatus or device). Examples of a computer readable medium include a semiconductor or solid state memory, magnetic tape, a removable computer diskette, and random access memory (RAM), a read-only memory (ROM), a rigid magnetic disk and an optical disk. Current examples of optical disks include compact disk-read only memory (CD-ROM), compact disk-read/write (CD-R/W)/DVD and BD (Blu-Ray™ Disc).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for handling a magnetic tape cartridge having a magnetic tape and having a cartridge memory, comprising the steps of:
    reading cartridge mount information from said cartridge memory;
    determining from said cartridge mount information whether the present mount is the first mount of said magnetic tape cartridge; and
    if so, apart from normal processing of said tape, fast forward and rewind said magnetic tape of said magnetic tape cartridge.

2. The method of claim 1, wherein said fast forward is to end of tape (EOT) and said rewind is to beginning of tape (BOT).

3. A method for handling a magnetic tape cartridge having a magnetic tape and having a cartridge memory, comprising the steps of:
    reading cartridge mount information from said cartridge memory;
    determining from said cartridge mount information whether the present mount is the first mount of said magnetic tape cartridge;
    if so, monitoring input/output with respect to said magnetic tape cartridge for write errors during said mount;
    determining whether the number of monitored write errors meets a predetermined threshold; and
    if so, apart from normal processing of said tape, fast forward and rewind said magnetic tape of said magnetic tape cartridge.

4. The method of claim 3, wherein said fast forward is to end of tape (EOT) and said rewind is to beginning of tape (BOT).

5. The method of claim 3, wherein said monitoring step comprises monitoring for hard errors.

6. The method of claim 5, wherein said determining step threshold comprises one said hard error.

7. The method of claim 6, comprising the additional steps of:
    saving the data being written at the occurrence of said hard error; and
    rewriting said saved data.

8. A magnetic tape drive, comprising:
    a cartridge loader configured to mount a magnetic tape cartridge, said magnetic tape cartridge having a magnetic tape and having a cartridge memory;
    a tape transport configured to move said magnetic tape longitudinally;
    cartridge memory interface configured to communicate with respect to said cartridge memory;
    recording channel configured to write and/or read data with respect to said magnetic tape;
    control configured to operate said magnetic tape drive to:
    read cartridge mount information from said cartridge memory at said cartridge mount interface;
    determine from said cartridge mount information whether the present mount is the first mount of said magnetic tape cartridge; and
    if so, apart from normal processing of said tape, operate said tape transport to fast forward and rewind said magnetic tape of said magnetic tape cartridge.

9. The magnetic tape drive of claim 8, wherein said fast forward is to end of tape (EOT) and said rewind is to beginning of tape (BOT).

10. The magnetic tape drive of claim 8, wherein said control is additionally configured to:
if said control determines from said cartridge mount information that the present mount is the first mount of said magnetic tape cartridge, monitor input/output with respect to said magnetic tape cartridge by said recording channel for write errors during said mount;
determine whether the number of monitored write errors meets a predetermined threshold; and
if so, operate said tape transport to fast forward and rewind said magnetic tape of said magnetic tape cartridge.

11. The magnetic tape drive of claim 10, wherein said fast forward is to end of tape (EOT) and said rewind is to beginning of tape (BOT).

12. The magnetic tape drive of claim 10, wherein said control is configured to monitor for hard errors.

13. The magnetic tape drive of claim 12, wherein said predetermined threshold comprises one said hard error.

14. The magnetic tape drive of claim 13, additionally comprising data storage, and wherein said control is additionally configured to:
save to said data storage the data being written at the occurrence of said hard error; and
rewrite said saved data to said magnetic tape via said recording channel.

15. An automated data storage library, comprising
a plurality of storage shelves configured to store magnetic tape cartridges;
a robot accessor configured to transport said magnetic tape cartridges, and configured to communicate with respect to a cartridge memory of a magnetic tape cartridge;
library control configured to operate said robot accessor to transport a magnetic tape cartridge and to read cartridge mount information from said cartridge memory at said robot accessor, and said library control configured to determine from said cartridge mount information whether the present mount is the first mount of said magnetic tape cartridge; and
at least one magnetic tape drive, comprising:
a cartridge loader configured to mount a magnetic tape cartridge;
a tape transport configured to move said magnetic tape longitudinally;
recording channel configured to write and/or read data with respect to said magnetic tape; and
control configured to operate said magnetic tape drive to, if said library control indicates said present mount of a magnetic tape cartridge transported by said robot accessor to said cartridge loader is the first mount of said magnetic tape cartridge, apart from normal processing of said tape, operate said tape transport to fast forward and rewind said magnetic tape of said magnetic tape cartridge.

16. The automated data storage library of claim 15, wherein said fast forward of said magnetic tape drive is to end of tape (EOT) and said rewind is to beginning of tape (BOT).

17. The automated data storage library of claim 15, wherein said magnetic tape drive control is additionally configured to:
if said library control determines from said cartridge mount information that the present mount is the first mount of said magnetic tape cartridge, monitor input/output with respect to said magnetic tape cartridge by said recording channel for write errors during said mount;
determine whether the number of monitored write errors meets a predetermined threshold; and
if so, operate said tape transport to fast forward and rewind said magnetic tape of said magnetic tape cartridge.

18. The automated data storage library of claim 17, wherein said magnetic tape drive control is configured to monitor for hard errors.

19. The automated data storage library of claim 18, wherein said predetermined threshold comprises one said hard error.

20. The automated data storage library of claim 19, wherein said magnetic tape drive additionally comprises data storage, and wherein said magnetic tape drive control is additionally configured to:
save to said data storage the data being written at the occurrence of said hard error; and
rewrite said saved data to said magnetic tape via said recording channel.

* * * * *